358-74.      OR      3,541,240      SR
Nov. 17, 1970      E. W. CURTIS      3,541,240
AUTOMATIC BEAM CURRENT LIMITING USING REFERENCE CURRENT SOURCES
Filed May 22, 1968
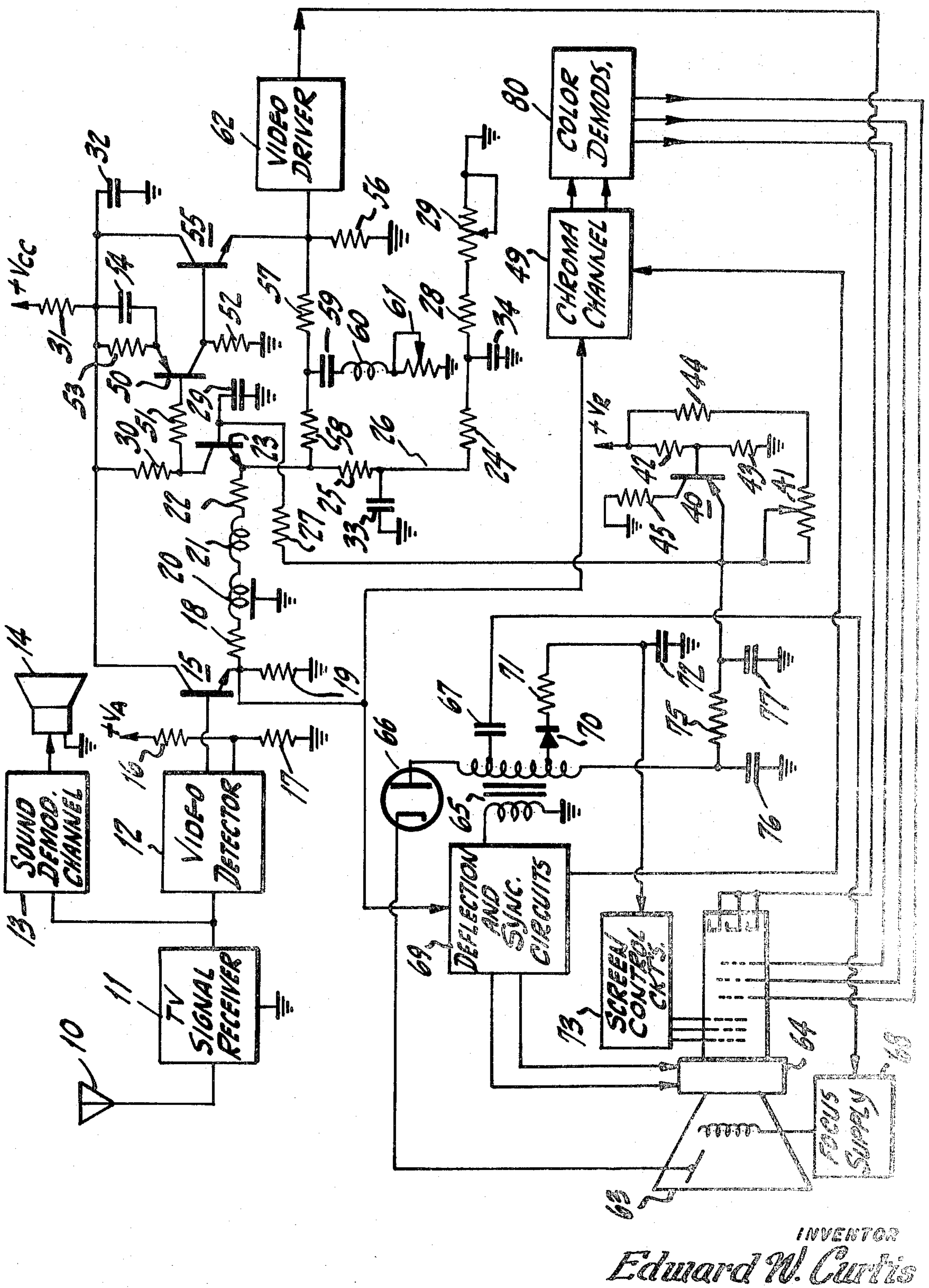
INVENTOR
Edward W. Curtis
BY Eugene M. Whitacre
ATTORNEY United States Patent Office
3,541,240
Patented Nov. 17, 1970

3,541,240

AUTOMATIC BEAM CURRENT LIMITING USING REFERENCE CURRENT SOURCES

Edward W. Curtis, Indianapolis, Ind., assignor to RCA Corporation, a corporation of Delaware Filed May 22, 1968, Ser. No. 730,994
Int. Cl. H04n 3/16, 5/44
U.S. Cl. 178—5.4 7 Claims

ABSTRACT OF THE DISCLOSURE

There is disclosed a system for limiting the amount of beam current drawn by a kinescope regardless of the particular kinescope efficiency and irrespective of changes in signal or biasing requirements. The circuit provides a means for limiting the drive to the kinescope without causing degradation of the deflection system and other perturbations which will adversely effect the overall quality of the final display. The circuit operates by sensing the amount of current flowing through a high voltage winding of a transformer used in the kinescope power supply and uses this current to control a switch coupled to the video amplifier chain. The switch serves to effect the D.C. bias of the video chain in a direction to reduce the kinescope drive when the levels associated therewith become critical.

This invention relates to color television receivers and more particularly to automatic power drive control circuits for a kinescope employed therein.

In a conventional television receiver a brightness control is usually provided for adjusting the bias between the grid and cathode electrodes of a kinescope. In essence such brightness variations can be obtained by a D.C. control that serves to effect the quiescent operating point between the grids and cathodes of this kinescope and thereby obtain a greater or lesser effect on the background qualities of the scene to be displayed. Certain conventional receivers employ brightness control by means of a D.C. level shift which serves to operate on the quiescent bias of a luminance amplifier chain incorporated in a television receiver. This luminance amplifier serves to process the Y or luminance components contained in a composite television signal which are in essence those components necessary and utilized for monochrome transmission as well. In order to preserve the D.C. content contained in the composite signal for proper reproduction of the transmitted television scene the luminance channel is usually direct coupled to the appropriate electrodes of the kinescope. In this manner a change in the bias or D.C. operating point of the luminance amplifier serves to effect the bias to the appropriate kinescope electrode and hence the brightness or background quality of the black and white displayed information. Of course, due to the nature of the presentation of color images as being formulated by the suitable matrixing of those luminance components with color information signals processed by the receiver and also contained in the composite signal, the D.C. bias control, described above, also effects the brightness qualities of a color display as well. Basically in order to enable the viewer to obtain a pleasurable display containing a desired amount of light intensity from a color television receiver the kinescope employed therein is caused to operate with relatively high potentials on its electrodes (as ultor, screen and focus electrodes) which result in fairly high beam currents. In essence this results in a relatively high power dissipation for the kinescope which thereby requires well designed high voltage power supplies and associated circuitry. However, the desire to obtain television displays with high or large light intensity levels may further present other problems when the operating conditions for the kinescope are exceeded which may be due to the aging of components, power supply or line changes and so on. Hence it becomes necessary to limit the amount of drive available to the kinescope when a number of adverse situations arise. The requirements of high voltage and high current if maintained within safe limits can produce a desired picture without difficulty or damage to the kinescope and within safe commercial standards. However, if for some reason the levels go beyond those safe operating levels or as the voltage or current goes higher such conditions could result in excessive X-ray generation or radiation by the kinescope circuitry of the receiver. Furthermore, excessive levels of operation may result in over dissipation of the kinescope itself, hence shortening its life and leading to eventual destruction thereof. Also, while the kinescope may be capable of limited periods of operation at such excessive levels without destruction or damage thereto such conditions may result in loading the high voltage supply, furnishing power to the kinescope, which will result in a degradation of the deflection system, the linearity of the scan, a change or adverse effect on the size of the raster, a blooming, as going brighter and darker with changes in scene content, a change in the effective beam diameter resulting from improper focusing control and so on. In essence an adverse loading of the high voltage supply driving the kinescope can very well cause the television receiver employing the kinescope to produce a display which is totally unaceptable or incapable of being enjoyable viewed.

Accordingly, it is therefore an object of the present invention to provide a circuit for limiting the amount of drive to a kinescope employed in a color television receiver within a safe area of operation.

It is a further object of the present invention to provide an improved circuit for automatically controlling the amount of beam current drawn by a kinescope employed in a color television receiver.

Still another object is to provide an improved circuit for automatically controlling the amount of current drawn by the kinescope by varying the bias on a luminance amplifier.

According to a preferred embodiment of the present invention a circuit operates to control the bias on a video chain or luminance amplifier which is direct coupled to the cathode electrodes of a kinescope. The circuit operates to automatically sense the total current flowing through the output winding of a transformer used in a high voltage supply. The sensing circuit serves to monitor this current with reference to a fixed level to assure that the total current supplied to the kinescope is within a safe operating region. During this operating mode the sensing circuit generates a regulated bias which serves to operate the luminance amplifier at a desired quiescent point. Brightness control, during this mode defining safe operation, is available to the consumer by means of a potentiometer coupled to the video amplifier and effective to manually change the D.C. quiescent operating points. If for any reasons the total current supplied to the kinescope increases beyond a predetermined safe level the sensing circuit detects this and operates to remove regulation of the bias supplied to the video amplifier chain and now subjects the video amplifier to a bias voltage which is changing in proportion to the total current drawn by the kinescope and in a direction to counteract this increase in current. This is accomplished by increasing the bias between the grid and cathode electrodes of the kinescope thus forcing the kinescope towards cutoff. During this mode a large loop gain is afforded by the sensing circuit, which gain is great enough to counteract to try to defeat any attempt by the consumer to further increase the brightness capability of the picture by means of the above described potentiometer.

Referring to the figure an anatenna 10 receives radio frequency television signals. Television signal receiver 11 coupled to antenna 10 serves to further process these signals by converting the radio frequency signal to intermediate frequency or I.F. signals by means of conventional and known techniques. Such techniques may employ a mixer and a local oscillator together with suitable stages of amplification to obtain the television intermediate frequency. A video detector 12 has its input coupled to the output of the television signal receiver 11 and contains a diode circuit arranged in a detector configuration which is responsive to the I.F. signals to derive therefrom a composite television signal.

A sound demodulator channel 13 is also coupled to the output of the television signal receiver and serves to detect the frequency modulated sound carrier and sidebands thereof to provide a signal representative of the audio transmitted for application to the speaker 14.

An output of the video detector 12 is coupled to the base electrode of a transistor 15 arranged in a common collector or emitter follower configuration. A voltage divider comprising resistors 16 and 17 is coupled between a reference voltage designated as $+V_A$ and a point of reference potential such as ground. The junction formed by resistors 16 and 17 is shown coupled to an input of the video detector 12 for biasing or referencing said detector to a selected D.C. level. This bias also serves to bias the base electrode of transistor 16. The emitter electrode of transistor 15 is coupled to ground through a resistor 19 while the collector electrode is returned to a source of potential designated as $+V_{cc}$ through a decoupling resistor 31 bypassed by capacitor 32. The emitter electrode of transistor 15 presents a low impedance driving source and as such is coupled to one terminal of a series network comprising resistor 18, delay 20, inductor 21 and resistor 22 respectively. The other terminal of this series network evidenced by resistor 22 is coupled to the emitter electrode of transistor 23 arranged in a common base configuration. The emitter electrode of transistor 23 is returned to ground through a series combination of resistor 25, lead 26, resistors 24 and 28, and variable resistor 29. The junction between resistor 25 and lead 26 is bypassed to ground for high frequency A.C. signals by capacitor 33. The junction between resistors 24 and 28 is returned to ground for A.C. signals through capacitor 34. Transistor 23 receives its bias via resistor 27 having one terminal connected to the base electrode of transistor 23 and its other terminal coupled to the junction between the emitter electrode of a transistor 40 and one terminal of a voltage divider, comprising variable resistor 41 in series with resistor 44. Resistor 44 has a terminal connected to a $+V_R$ reference supply. The collector electrode of transistor 40 is returned to ground through a load resistor 45. Base bias is supplied to transistor 40 by means of a voltage divider comprising resistors 42 and 43 coupled between the $+V_R$ supply and a point of reference potential. The junction formed thereby being connected to the base electrode of transistor 40. As will be explained subsequently transistor 40, as supplying bias to the base electrode of transistor 23, serves conjointly with the high voltage supply and associated circuitry to control the level of the D.C. coupled to the electrodes of the kinescope by operating on transistor 23.

The base electrode of transistor 23 is bypassed to ground for signal frequencies by means of capacitor 29. The collector electrode of transistor 23 is coupled through a resistor 30 to the decoupled point emanating from the $+V_{cc}$ supply.

A transistor 50 in a common emitter configuration has its base electrode coupled to the collector electrode of transistor 23 via resistor 51. The collector electrode of transistor 50 is coupled to the point of reference potential through a resistor 52; the emitter electrode of transistor 50 is coupled through a resistor 53 to the decoupled $+V_{cc}$ supply and is bypassed by a capacitor 54. A further transistor 55 is arranged in a common collector configuration having a collector electrode returned to the decoupled point of the $+V_{cc}$ supply, and the emitter electrode of transistor 55 is referenced to ground through a resistor 56. Bias and drive for transistor 55 is obtained by coupling the base electrode to the collector electrode of transistor 50.

A feedback network comprising the series connection of resistors 57 and 58 is coupled between the emitter electrode of transistor 55 and the emitter electrode of transistor 23. The junction between resistor 57 and 58 is returned to ground through a series path comprising capacitor 59, inductor 60, and variable resistor 61. These components supply negative feedback to the overall amplifier configuration comprising transistors 23, 50 and 55. The luminance amplifier, just described, having a signal output represented by the emitter electrode of transistor 55, supplies video signals to the input of a video driver circuit 62 utilized to supply relatively large luminance signals to the appropriate electrodes, such as the cathodes, of a color kinescope which may, for example, be a three-gun shadow mask tube.

Also present in a color television receiver is a deflection and sync circuit 69 and a chroma channel 49. A conventional television receiver may also include automatic gain control circuitry, automatic chroma control circuitry and so on which are not shown or necessary for the explanation of the present invention. The inputs to the deflection and sync circuits 69 and the chroma channel 49 are supplied by the low impedance output at the emitter electrode of transistor 15. The function of the sync circuit, included within rectangle 69, is to operate on the composite video signals present at its input to retrieve the synchronizing components therefrom, necessary to assure proper presentation of the television signal display. The synchronizing circuits in turn supply an output to the input of the deflection circuits also included within rectangle 69. The deflection circuits serve to generate synchronized horizontal and vertical drive waveshapes for deflecting the electron beams of the color kinescope 63 which action is necessary to provide a raster. Accordingly two outputs from the deflection and sync circuit 53 are shown coupled to a yoke 64 associated with the kinescope 63 for deflecting the electron beams both horizontally and vertically under the control of the waveforms generated in rectangle 69. The high voltage necessary to operate the kinescope 63 is derived by the rectification of appropriate flyback pulses generated by the action of the deflection circuits included in rectangle 69. For this purpose the primary winding of a flyback transformer 65 is shown coupled between an output of the deflection circuits 69 and a point of reference potential such as ground. The secondary winding of transform 65 has a plurality of taps selected at suitable points thereon. A high voltage tap has a terminal connected to the anode of a high voltage rectifier 66 whose cathode is coupled to the ultor or second anode electrode of the kinescope 63. The high voltage rectifying diode 66 serves to rectify the flyback pulses to produce a potential at the ultor which is filtered by the capacitance of the ultor to obtain thereat a D.C. level which may, for example, be of the order of magnitude of 25 kv.

A second lower voltage tap is coupled through a capacitor 67 to the input of a focus supply 68 whose output is coupled to suitable focusing electrodes associated with kinescope 63. The focus supply 68 serves to rectify flyback pulses to provide a suitable focusing potential for the kinescope 63. This potential, being applied to the appropriate electrodes of the kinescope, maintains the electron beams within a well defined diameter.

A third still lower voltage tap on the secondary winding of transformer 65 is coupled through a half wave rectifying circuit comprising diode 70 having its anode coupled to said tap, and its cathode coupled through a resistor 71 to a terminal of a filtering capacitor 72 having the other terminal coupled to ground. The conventional half wave rectifier circuit shown, produces a positive voltage for application to the screen control circuits 73 having outputs coupled to the screen electrodes of the kinescope 63. The screen control circuits together with the voltage impressed thereon are necessary to assure that the kinescope 63 will operate at suitable electron beam current levels necessary to supply a good quality display. A return path for the secondary winding of transformer 65 is provided by means of resistor 75 coupled between the lower terminal of the secondary winding and the emitter electrode of transistor 40. Resistor 75 also serves to form part of a filter with capacitors 76 and 77, each coupled between a respective terminal of said resistor and a point of reference potential such as ground.

The chroma channel 49 functions to retrieve and process the color information present in the composite signal within the bandwidth associated with such information. The chroma channel, as shown herein, also includes a burst amplifier and subcarrier oscillator. The burst amplifier serves to retrieve burst information present in the composite signal at the back porch of the horizontal synchronizing pulses. The retrieved bursts are utilized to synchronize a subcarrier oscillator operating at the color subcarrier frequency. The output of the chrominance channel 49 containing chroma information and the oscillator output are applied to inputs of color demodulators 80.

The function of the color demodulators 80 is to synchronously demodulate the chrominance information using respective appropriate phased outputs of the color oscillator as a standard. In this manner color difference signals are provided at the outputs of the color demodulators for coupling to the appropriate electrodes of the kinescope 63.

The operation of the above described circuit which embodies the principle of the present invention will now be described in greater detail.

Video signals provided by detector 12 are coupled to the base of the emitter follower 15 which provides a high impedance to the detector to avoid loading the same. The output of emitter circuit of transistor 15 provides a relatively low driving impedance. The current drive capabilities of this stage are then used to drive the deflection and sync circuits 69, the chroma channel 49 while further providing a low output impedance for coupling to the input of delay line 20. Transistor 23 is a common base stage whose emitter electrode provides a low input impedance. Resistors 18 and 22 coupled in series with the delay line are selected according to the characteristic impedance of the delay line 20 and are of a magnitude comparable with said impedance. In this manner delay line 20 is terminated both at its input and output terminals, thus minimizing transient ringing which would otherwise occur due to delay line misterminations. The common base stage 23 by means of its collector circuit furnishes drive to the common emitter stage including transistor 50 to provide the necessary voltage gain and polarity signal information required. The collector load of transistor 50 is coupled to a second emitter follower comprising in part transistor 55 necessary to drive the output video driver stage 62 from a low impedance source. The luminance amplifier just described has a feedback network comprising resistors 57 and 58 which serve to maintain bandwidth and stabilize the D.C. operating points or bias levels of the luminance amplifier. Disregarding the effects of capacitor 59, inductor 60 and variable resistor 61 the amplifier is tailored to give an amplifier response which begins to fall off at approximately 1.5 mHz. and, produces a gain of ½ the midband at a frequency of about 3.08 mHz. This response is essentially the response at the output of the video detector 12, rolled off to some degree, to provide an amplifier characteristic that has some inherent depeaking and has relatively low 3.58 mHz. chroma subcarrier response. The low gain chroma subcarrier response is necessary to prevent excessive dot patterns from appearing on the face of the kinescope 63.

Except for the effects of various distributed capacitance the gain of the system is essentially kept broadband by the feedback current supplied through resistors 57 and 58.

The series network comprising capacitor 59, inductor 60 and variable resistor 61 combine to form a series resonant circuit at about 7.5 mHz. This circuit will provide peaking of the frequency response around the above noted frequency (1.5 mHz.) by reducing the feedback at this point. As can be seen from the circuit the series network has an impedance near the resonant frequency which approaches the magnitude of resistor 61. Accordingly, if resistor 61 was short circuited the branch impedance of this series circuit would be negligible compared to the magnitude of resistors 47 and 58 at the frequency of 1.5 mHz. This condition would permit no feedback signal for frequencies surrounding this frequency point to be coupled back to the input of transistor 23 thereby increasing the amplifier gain. The amount of peaking present in the response is a function of the Q or quality factor of this network and the frequency of resonance. Due to the relative isolation provided by resistors 57 and 58 the amount of peaking is relatively independent of variations in the impedances between the emitter electrode of transistor 23 and ground, and the emitter electrode of transistor 55 and ground. In this manner the frequency response of the amplifier at maximum peaking, which corresponds to shorting out resistor 61, can be made to have approximately a 40% higher gain at 1.5 mHz. then at the midband range of luminance signals. With this setting of resistor 61 the gain at approximately 3 mHz. will be about 30% of the gain at 1.5 mHz., and the color subcarrier frequency (3.58 mHz.) will be further attenuated by a factor of over 10% when compared to the response of the amplifier substantially corresponding to the omission of the series network or maximum resistance of resistor 61.

The above described circuit as seen from the figure is direct coupled for video signals to the cathodes of the kinescope 63. Direct coupling of the luminance is desired to preserve the D.C. components present in the composite video signal for application to the kinescope electrodes in order to produce a display corresponding in correct brightness levels for the transmitted picture. Accordingly, a change in D.C. or a change in the operating points of the video amplifier stages described above, as comprising transistors 15, 23, 50 or 55, results in a change in the D.C. level applied to the cathode of the kinescope 63. Such a change, in turn, effects the bias between the cathodes and the grid electrodes of the kinescope 63 and hence may serve to lower or raise the beam current produced by the kinescope and thereby effect the brightness of light intensity of the display.

The brightness control comprising variable resistor 29 which is coupled to the emitter electrode of transistor 23 through the series network of resistors 25, 24 and 28 serves to change the D.C. potential at the emitter and therefore the collector electrode of transistor 23 and hence the D.C. coupled to the kinescope electrodes, and accordingly can be designated as a brightness control. Usually the brightness control 29, is located on the front panel of the receiver and is made available for control by the consumer or viewer. In order to accomplish this a cable 26 must be routed from the luminance amplifier board or chassis circuit location to the front panel, and as such the length of the cable 26 may be quite substantial. Because of the frequencies encompassed within the luminance bandwidth such a length of cable may behave as a delay line. If this delay line 26 were only terminated by the brightness control 29, which would be the case if resistors 24 and 28 and capacitor 34 were omitted, the termination would vary according to the setting of the brightness control 29. In this manner the cable 26 behaving as a delay line would cause signals of certain frequencies appearing at the emitter electrode of transistor 23, either due to the feedback network or to the video input thereto, to couple through the delay line 26 and are reflected back again to the input at the emitter electrode of transistor 23. This would cause a poor transient response in the luminance channel for certain signal frequencies not sufficiently bypassed by capacitor 33. In order to avoid this resistor 24 is selected to provide a limiting termination for cable 26 at such frequencies. A terminal of resistor 24 is then coupled to the output of the delay line while the other terminal is bypassed to ground for all luminance frequencies by means of capacitor 34. In this manner the delay line 26 sees a fixed terminating impedance of a magnitude equal to resistor 24 for all A.C. signals within the luminance band. Capacitor 34 further serves in combination with resistor 28, which resistor has one terminal coupled to the junction between capacitor 34 and resistor 24 and the other terminal in series with the brightness control 29, to bypass potentiometer noise generated by metal to metal contact due to the nature and construction of variable resistors as 29 presently utilized in conventional television receivers. Resistor 28 assures that a fixed impedance is also in the circuit to always afford an R.C. network to eliminate such potentiometer noise independent of the setting of resistor 29. In the above described manner resistor 29 serves to control the D.C. at the emitter electrode and hence at the collector electrode of transistor 23 without having its setting effectively degrading the magnitude of the A.C. signals or otherwise affecting the A.C. characteristics of the luminance amplifier described.

In well designed color sets it is desired to operate the kinescope at fairly large beam currents and higher voltage levels to produce a good quality display evidenced, in part, by suitable brightness levels. However, it is also necessary to prevent driving the kinescope so hard that the safe dissipation characteristics of the kinescope are exceeded. Furthermore excessive drive even within the capacity of the kinescope may result in an excessive amount of X-ray radiation emanating from the color television receiver due to the high voltage and currents. Furthermore the high voltage supply if optimumly utilized will begin to overload before the limiting point of the kinescope is reached which will cause degradation in the overall picture, resulting from a plurality of factors, such as change in the deflection sensitivity, blooming or loss of focus, loss of horizontal linearity and an overall degradation in the size of the raster.

This invention includes circuitry sufficient to limit the maximum amount of bias on the video amplifier chain at a point where the maximum capability of the kinescope is reached with regard to the above described factors. The operation of the circuit is as follows. Initially assume that the current drawn through capacitor 67, connected to a high voltage tap on the secondary winding of transformer 65, and the current drawn by the half wave rectifier circuit, comprising, in part, diode 70 connected to a third tap on the secondary winding of transformer 65, are both zero. In addition, assume that the kinescope 63 is cutoff which might correspond to the maximum resistance setting of resistor 29. Under these conditions the magnitude of the current through the high voltage rectifier tube 66 will be small as being that due to kinescope leakage in this cutoff condition. With these assumptions the current flowing through resistor 75 will be approximately zero (or kinescope leakage current) since this current is equal to the sum of the above three currents. Under these conditions transistor 40 is biased on and current is conducted from the $+V_R$ reference supply through resistors 41 and 44 via the emitter to collector path of transistor 40 through resistor 45 to ground. The amount of current drawn for the above conditions depends on the setting of resistor 41 which may be designated as a brightness limiter threshold adjustment. Under optimum operating conditions resistor 41 is adjusted such that the current flowing through the collector to emitter path of transistor 40 to ground is equal to the amount of current at the limiting threshold of the kinescope or the maximum current through the high voltage rectifier 66. Resistors 42 and 43 are chosen such that the voltage at the base of transistor 40 plus the voltage drop from the base to emitter of transistor 40 is the desired bias voltage for transistor 23, whose base electrode is coupled to the emitter electrode of transistor 40 via resistor 27. As long as transistor 40 is conducting the voltage at its emitter electrode is relatively constant due to the selection of resistors 42 and 43 and as further being referenced to the stable supply $+V_R$. Assume now that the brightness control 29 is caused to decrease in resistance, that is the brightness control may be turned by the consumer. This action decreases the D.C. available at the emitter electrode of transistor 23 and serves to bias the stage in a direction to cause increasing conduction. This causes the collector electrode of transistor 23 to go negative which in turn causes the collector electrode or transistor 50 to go more positive thus causing the emitter of transistor 55 to go more positive which in turn serves to decrease the D.C. by means of video amplifier driver 62 at the cathodes of the kinescope, causing the kinescope to conduct harder. The increase in conduction corresponding to turning the kinescope on causes the ultor electrode of the kinescope to draw current, resulting in an increase from zero of the ultor current through diode 66.

As this current increases the current through resistor 75 increases correspondingly. The current through resistors 41 and 44 is relatively constant and is equal to the sum of the current through resistor 75, plus the current through the collector to emitter path of transistor 40. Since the current through resistors 41 and 44 is constant and since the current through resistor 75 increased, the current through transistor 40 must decrease. However, the voltage at the emitter of transistor 40 remains relatively constant, as long as transistor 40 is conducting, since it is dependent upon the voltage at the base electrode and the base to emitter drop. This voltage then is well regulated as long as transistor 40 is conducting. If the drive to the kinescope continued to increase the current through resistor 75 would increase as well, as will the current supplied to the second anode of the kinescope 63. This will cause current through the collector to emitter path of transistor 40 to approach zero. The voltage at the emitter electrode of transistor 40 will at this point decrease, due to the fact that transistor 40 goes to cutoff and hence the voltage at its base electrode becomes more positive than the voltage at its emitter. Under these conditions if the consumer, further desired to decrease resistor 29 which will tend to bias transistor 23 in a more conductive state this attempt will be counteracted by a decrease in the voltage at the emitter electrode of transistor 40 for two reasons. First, transistor 40 is cutoff, thus there is no regulation of voltage at the emitter electrode and therefore at the base of transistor 23. Secondly, there is an increase in the current to the kinescope 63 via the high voltage rectifier 66 which serves to produce a larger voltage drop across resistors 41 and 44, thus forcing the base of transistor 23 towards ground or to follow these current variations.

The degree of limiting afforded by this circuit is in part determined by the cutoff characteristics of transistor 40, which may be very sharp, and the overall large loop gain of the system when transistor 40 is cutoff. In the normal case the currents flowing through the diode 70 to the screen electrodes of the kinescope, and that current through capacitor 67 to the focus electrodes of the kinescope are not zero, but as can be seen, the combined magnitude of these currents serves to add a constant current through resistors 44, 41, 75 and the secondary winding tap associated with the focus and screen supplies. This constant current is independent of the kinescope used with a given chassis and will be dependent only upon the values of the components associated with the high voltage supplies for that chassis. In this manner the limiting threshold as adjusted by resistor 41 can be set up to compensate for any loss of current through transistor 40 due to the quiescent and dynamic values of the kinescope screen and focus electrode currents.

The circuit further includes arc protection particularly with respect to high voltage arcs which may occur across the high voltage rectifier tube 66. Such arcs will tend to transfer the energy stored in the capacitance associated with the second anode of the kinescope back into the circuit, comprising in part, transistor 40. These arcs are capable of producing back currents through resistor 75 of one or two amperes. To enable the circuit to accept this energy without damage to the transistor 40 or to the other components, capacitor 77 and resistor 45 have been included. In this manner resistor 45 limits the current handling capability of transistor 40 so as to prevent damage to the transistor. Capacitor 77 provides a means of storing charge or filtering these current surges and hence prevent them from effecting the voltage at the emitter electrode of transistor 40. A circuit embodying the principles of the above described invention was built and operated using the following components.

Transistor 15—SE1002
Transistor 23—2N3694
Transistor 50—2N4121
Transistor 55—2N3643
Transistor 40—1473581-1
Resistor 16—2190 ohms
Resistor 17—390 ohms
Resistor 18—560 ohms
Resistor 19—1,000 ohms
Resistor 22—680 ohms
Resistor 24—10 ohms
Resistor 25—470 ohms
Resistor 27—470 ohms
Resistor 28—100 ohms
Resistor 29—20,000 (variable)
Resistor 30—330 ohms
Resistor 31—10 ohms
Resistor 41—2,500 (variable)
Resistor 42—2,000 ohms
Resistor 43—560 ohms
Resistor 44—2,700 ohms
Resistor 45—100 ohms
Resistor 51—1,000 ohms
Resistor 52—1,800 ohms
Resistor 53—27 ohms
Resistor 56—1,800 ohms
Resistor 57—4,700 ohms
Resistor 58—3,900 ohms
Resistor 61—20,000 (variable)
Resistor 71—10,000 ohms (1 watt)
Resistor 75—1,000 ohms
Capacitor 29—10 microfarads
Capacitor 33—.01 microfarad
Capacitor 34—100 microfarads
Capacitor 54—.0027 microfarad
Capacitor 32—0.1 microfarad
Capacitor 59—120 micromicrofarads
Capacitor 67—470 micromicrofarads
Capacitor 72—.02 microfarad
Capacitor 76—.01 microfarad
Capacitor 77—50 microfarads
Inductor 21—15 microhenries
Delay Line—(680 ohms)
Inductor 60—36 microhenries
Diode 70—RCA #1476183-2
Rectifier 66—3CU3
$+C_{cc}$—+30 v.
$+V_A$—+15 v.
$+V_R$—+15 volts Zener regulated
$+V_A=+V_R$

What is claimed is:

1. In a color television receiver employing a kinescope having a plurality of electrodes operated from a high voltage supply, which high voltage supply generates suitable operating potentials by the rectification of pulses obtained from deflection circuits included in said receiver, said receiver containing a luminance amplifier responsive to monochrome information contained in a composite television signal, for amplifying the same and direct coupling said information to suitable electrodes of the kinescope not biased by said high voltage supply, but operable upon the application of suitable potentials thereto to effect the brightness of a display caused to appear on a screen of said kinescope, the combination comprising, (a) means coupled to said high voltage supply for monitoring the total operating current supplied to said kinescope, (b) means for generating a fixed reference current having a magnitude determined by a predetermined permissible total operating current, (c) means coupled to said video amplifier, responsive to said total operating current and said reference current for applying to said amplifier a first operating bias during a first mode in which said total operating current does not exceed said reference current, and a second operating bias in a second mode in which said total operating current exceeds said reference current, said bias in said second mode varying in proportion to said total operating current to change the D.C. level appearing at said suitable electrodes of said kinescope via said luminance amplifier, in a direction to decrease the brightness of said display on said kinescope's screen, whereby said total operating current is reduced.

2. In a color television receiver employing a kinescope having ultor, screen, and focus electrodes, and a grid and cathode electrode operative to control the magnitude of a beam of current supported by said kinescope and having a path between said ultor and cathode electrodes, said receiver including a transformer responsive to deflection pulses for providing at a plurality of taps on a winding thereof different amplitude deflection pulse levels for application to rectifying circuits for providing operating potentials for said ultor, screen and focus electrodes, said receiver including a luminance amplifier for processing monochrome information contained in a composite video signal for amplifying the same and direct coupling said information to said cathode electrode, in combination therewith, (a) a transistor, having its collector to emitter path coupled between said winding and a point of reference potential, (b) a reference voltage divider coupled to the base electrode of said transistor for applying a fixed predetermined bias thereto, (c) means coupling the emitter electrode of said transistor to said luminance amplifier for biasing said amplifier at a current level determined by said reference voltage applied to said transistor's base electrode, (d) a stable current source coupled between the junction of said collector to emitter path of said transistor and said winding for applying current to said winding and said collector to emitter path, and of a predetermined magnitude selected according to a predetermined beam of current supported by said kinescope between said cathode and ultor electrodes, said predetermined beam of current defining a safe limit of operation for said kinescope, such that when said supported beam exceeds said safe limit a substantial portion of said reference current is supplied to said winding to cause said transistor to cutoff, whereby said bias on said luminance amplifier is no longer determinative by said reference voltage and said current level for said luminance amplifier cannot be supplied by said transistor, resulting in a change of bias on said cathode electrode in a direction to decrease said supported beam current.

3. In combination:

(a) a kinescope having at least ultor, screen and focus electrodes and a grid and cathode electrode operative upon the application of suitable potential levels applied therebetween, to control the magnitude of a current flowing between said cathode and ultor electrode of said kinescope, (b) a high voltage source for supplying operating potentials to said ultor, screen and focus electrodes, (c) first means coupled to said high voltage source for monitoring the total operating current supplied thereby to said kinescope, (d) second means for generating a reference current indicative of a safe permissible total operating current for said kinescope, (e) switching means having an input coupled to said first and second means and an output coupled to said cathode electrode, for applying to said cathode electrode a first bias determining a first current level between said cathode and ultor electrodes when said total operating current is less than said reference current and for applying a second bias, to said cathode electrode, when said total operating current begings to exceed said reference current, in a direction to decrease said current from said cathode electrode to said ultor electrode, said second bias varying in said direction according to the magnitude of said total operating current when said total operating current exceeds said reference current.

4. The combination according to claim 3 wherein said first means coupled to said high voltage source comprises a resistor in series with said high voltage source, said resistor having an input and output terminal, first and second capacitors, said first capacitor coupled between the junction of said high voltage winding and said resistor's input terminal and a point of reference potential, said second capacitor coupled between said resistor's output terminal and a point of reference potential and forming with said resistor a filter network for said high voltage supply, said output terminal being coupled to said input of said switching means.

5. The combination according to claim 3 wherein said high voltage source comprises a transformer having a primary and a secondary winding, said primary winding adapted to receive pulse signals, said secondary winding having a plurality of taps each of which supplies a voltage "stepped up" pulse signal for application to individual rectifying circuits associated with each tap.

6. Apparatus for use in a television receiver for limiting the power dissipation of a kinescope, said power dissipation determined in part by the bias on a beam current control electrode, comprising:

(a) a high voltage power supply for supplying operating potentials to suitable other electrodes associated with said kinescope, (b) means coupled to said high voltage supply for providing a level at an output thereof indicative of the total current drawn by said high voltage supply, (c) a current source for supplying a reference current having a magnitude equal to a predetermined total current capable of being safely drawn by said high voltage supply as operating said kinescope, (d) means coupled to said control electrode of said kinescope, responsive to said reference current and said level representing said total current for determining when said total current substantially equals said reference current, for altering the bias on said control electrode in a direction to decrease said total current drawn by said kinescope.

7. In a television receiver, employing a kinescope having ultor, screen and focus electrodes which are supplied operating potential from a high voltage source included in said receiver, said kinescope having a cathode control and a grid control electrode for applying a relative potential therebetween, to determine, in part, the beam current drawn by said kinescope between said cathode and ultor electrode, said beam current determinative of the total current supplied by said high voltage supply, apparatus for automatically maintaining said beam current within a safe operating region comprising, (a) a transistor having a base, collector and emitter electrodes, (b) means coupling the collector to emitter path of said transistor in series with said high voltage supply for providing a current path therethrough, (c) a voltage divider coupled to the base electrode of said transistor for maintaining the base electrode and therefore the emitter electrode of said transistor at a fixed regulated potential with respect to a reference potential, (d) a current source coupled to said collector to emitter path of said transistor, said source selected to provide a reference current having a fixed magnitude selected according to a maximum safe beam current level capable of being supplied by said kinescope, said reference current distributed between said high voltage supply and said collector to emitter path of said transistor, (e) means coupling the emitter electrode of said transistor to one of said control electrodes for biasing the same at said fixed regulated reference potential when a portion of said reference current flows through said collector to emitter path, and at a second nonregulated potential when a substantial portion all of said reference current flows through said high voltage supply corresponding to said nonconducting of said transistor and said kinescope beam current increasing in a direction to exceed said maximum safe level, said second nonregulated potential biasing said kinescope control electrode in a direction to counteract said beam current increase.

References Cited

UNITED STATES PATENTS

| | | | |
|---|---|---|---|
| 3,009,989 | 11/1961 | Ahrons et al. | |
| 3,072,741 | 1/1963 | Ahrons et al. | |
| 3,179,743 | 4/1965 | Ahrons et al. | |
| 3,465,095 | 9/1969 | Hansen et al. | 178—5.4 |

ROBERT. L. GRIFFIN, Primary Examiner

D. E. STOUT, Assistant Examiner

U.S. Cl. X.R.

178—7.5

UNITED STATES PATENT OFFICE
CERTIFICATE OF CORRECTION

Patent No. 3,541,240 Dated November 17, 1970

Inventor(s) Edward W. Curtis

It is certified that error appears in the above-identified patent and that said Letters Patent are hereby corrected as shown below:

Column 2, line 30, that portion reading "unaceptable" shoul read -- unacceptable --.
Column 2, line 71, that portion reading "to" (second occurrence) should read -- or --.
Column 3, line 30, that portion reading "16" should read -- 15 --.
Column 4, line 56, that portion reading "transform" should read -- transformer --.
Column 5, line 74, after "midband" and before "at" insert -- gain --.

Column 6, line 22, that portion reading "47" should read -- 57 --.
Column 6, line 55, that portion reading "cathode" should re -- cathodes --.

Column 10, line 2, that portion reading "$+C_{cc}$" should read -- $+V_{cc}$ --.
Column 11, line 31, that portion reading "begings" should r -- begins --.
Column 12, line 47, after "portion" and before "of" delete "all".

GNED AN SEALED

FEB 23 1971

(SEAL)
Attest:

Edward M. Fletcher, Jr.
Attesting Officer

WILLIAM E. SCHUYLER,
Commissioner of Pate